US008171740B2

(12) United States Patent
Bronson et al.

(10) Patent No.: US 8,171,740 B2
(45) Date of Patent: May 8, 2012

(54) ANNULAR RICH-QUENCH-LEAN GAS TURBINE COMBUSTORS WITH PLUNGED HOLES

(75) Inventors: Thomas J. Bronson, Mesa, AZ (US); Frank Joseph Zupanc, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 500 days.

(21) Appl. No.: 12/394,725

(22) Filed: Feb. 27, 2009

(65) Prior Publication Data

US 2010/0218504 A1 Sep. 2, 2010

(51) Int. Cl.
*F23R 3/06* (2006.01)
*F23R 3/50* (2006.01)
(52) U.S. Cl. ................. 60/804; 60/754; 60/732
(58) Field of Classification Search .......... 60/752, 60/754, 755, 757, 758, 804, 732
See application file for complete search history.

(56) References Cited

U.S. PATENT DOCUMENTS

| 2,807,139 | A |   | 9/1957  | Jackson |          |
|-----------|---|---|---------|---------------|----------|
| 3,593,518 | A |   | 7/1971  | Gerrard |          |
| 3,735,589 | A | * | 5/1973  | Caruel et al. | 60/757 |
| 4,392,355 | A |   | 7/1983  | Verdouw |          |
| 4,698,963 | A |   | 10/1987 | Taylor |          |
| 4,805,397 | A |   | 2/1989  | Barbier et al. |       |
| 5,187,937 | A |   | 2/1993  | Stevens et al. |       |
| 5,241,827 | A | * | 9/1993  | Lampes | 60/757 |
| 5,819,540 | A |   | 10/1998 | Massarani |       |
| 5,996,351 | A |   | 12/1999 | Feitelberg et al. |   |
| 6,101,814 | A |   | 8/2000  | Hoke et al. |         |
| 6,286,298 | B1 |  | 9/2001  | Burrus et al. |       |
| 6,810,673 | B2 | * | 11/2004 | Snyder | 60/732 |
| 7,065,972 | B2 |  | 6/2006  | Zupanc et al. |       |
| 2006/0272335 | A1 | * | 12/2006 | Schumacher et al. | 60/804 |
| 2007/0193248 | A1 | * | 8/2007 | Bessagnet et al. | 60/39.01 |
| 2008/0127651 | A1 |  | 6/2008 | Zupanc et al. |   |
| 2008/0134682 | A1 |  | 6/2008 | Garry et al. |   |
| 2009/0100840 | A1 | * | 4/2009 | Campion et al. | 60/754 |
| 2009/0139239 | A1 | * | 6/2009 | Zupanc et al. | 60/752 |
| 2010/0095679 | A1 |  | 4/2010 | Rudrapatna et al. | |

OTHER PUBLICATIONS

Bronson, T. J.; USPTO Office Action for U.S. Appl. No. 12/394,656 dated Jul. 27, 2011.
Lefebvre, A.H.; "Gas Turbine Combustion", Hemisphere Publishing, 1984, pp. 141-148.
Doerr, T., Blomeyer, M., and Hennecke, D.K.; "Experimental Investigation of Optimum Jet Mixing Configurations for RQL Combustors", ISABE (International Symposium on Air Breathing Engines), 1995.

(Continued)

Primary Examiner — Ted Kim
(74) Attorney, Agent, or Firm — Ingrassia Fisher & Lorenz, P.C.

(57) ABSTRACT

A combustor may include an outer liner having a first group of air admission holes and defining a plurality of outer liner regions. The combustor may further include an inner liner having a second group of air admission holes and defining a plurality of inner liner regions. The first group of air admission holes within a respective outer liner region may include a first plunged air admission hole approximately axially aligned with the respective fuel injector, a second plunged air admission hole approximately on the outer boundary line between the respective outer liner region and a first adjacent outer liner region, the first air admission hole being downstream of the second air admission hole, and a third plunged air admission hole approximately on the outer boundary line between the respective outer liner region and a second adjacent outer liner region.

16 Claims, 5 Drawing Sheets

OTHER PUBLICATIONS

Lincinsky, D.S., True, B., Vranos, A., Holdeman, J.D.; "Experimental Study of Cross-Stream Mixing in a Rectangular Duct", AIAA Paper 92-3090, 28th Joint Propulsion Conference, 1992.

USPTO Notice of Allowance and Fee(s) Due for U.S. Appl. No. 12/394,656; Date Mailed Nov. 16, 2011.

U.S. Appl. No. 11/947,337, filed Nov. 29, 2007.
U.S. Appl. No. 12/256,246, filed Oct. 22, 2008.

* cited by examiner

FIG. 8

# ANNULAR RICH-QUENCH-LEAN GAS TURBINE COMBUSTORS WITH PLUNGED HOLES

TECHNICAL FIELD

The following discussion generally relates to gas turbine engine combustors, and more particularly, to a quench jet arrangement for reducing NOx emissions from annular rich burn, quick-quench, lean burn (RQL) gas turbine engine combustors.

BACKGROUND

A gas turbine engine may be used to power various types of vehicles and systems. A particular type of gas turbine engine that may be used to power aircraft is a turbofan gas turbine engine. A turbofan gas turbine engine conventionally includes, for example, five major sections: a fan section, a compressor section, a combustor section, a turbine section, and an exhaust section. The fan section is positioned at the front, or "inlet," section of the engine and includes a fan that induces air from the surrounding environment into the engine and accelerates a fraction of the air toward the compressor section. The remaining fraction of air induced into the fan section is accelerated into and through a bypass plenum and out the exhaust section.

The compressor section raises the pressure of the air it receives from the fan section to a relatively high level. The compressed air from the compressor section then enters the combustor section. A ring of fuel nozzles in the combustor section injects a steady stream of fuel into a combustion chamber formed between inner and outer liners. The air/fuel mixture is ignited to form combustion gases. The combustion gases then flow into and through the turbine section, thereby causing rotationally mounted turbine blades to rotate and generate energy. The gases exiting the turbine section are exhausted from the engine via the exhaust section.

There is an increasing desire to reduce gaseous pollutant emissions, particularly oxides of nitrogen (NOx), that form during the combustion process. One approach to reduce NOx emissions is the implementation of a rich burn, quick quench, lean burn (RQL) combustion concept. A combustor configured for RQL combustion includes three serially arranged combustion zones: a rich burn zone at the forward end of the combustor, a quench or dilution zone downstream of the rich burn zone, and a lean burn zone downstream of the quench zone. By precisely controlling the zone stoichiometries between the air and fuel, high-temperature excursions can be reduced and the resulting NOx emissions can be minimized. The effectiveness of the RQL concept, however, is primarily dependent on the design of the quench section of the combustor in which the fuel-rich gases from the rich burn zone are rapidly mixed with excess air and passed to the lean burn zone. The design and development of the quench zone geometry is one of the challenges in the successful implementation of low-emissions RQL combustors.

Accordingly, it is desirable to provide a combustor with improved NOx emissions. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, a combustor for a turbine engine may include an outer liner having a first group of air admission holes and defining a plurality of outer liner regions, each outer liner region being separated from an adjacent outer liner region by an outer boundary line. The combustor may further include an inner liner circumscribed by the outer liner and forming a combustion chamber therebetween, the inner liner having a second group of air admission holes and defining a plurality of inner liner regions, each inner liner region being separated from an adjacent inner liner region by an inner boundary line. The combustor may further include a plurality of fuel injectors extending into the combustion chamber, each of the plurality of fuel injectors being associated with one of the outer liner regions and one of the inner liner regions. The first group of air admission holes within a respective outer liner region may include a first plunged air admission hole approximately axially aligned with the respective fuel injector, a second plunged air admission hole approximately on the outer boundary line between the respective outer liner region and a first adjacent outer liner region, the first air admission hole being downstream of the second air admission hole, and a third plunged air admission hole approximately on the outer boundary line between the respective outer liner region and a second adjacent outer liner region.

In accordance with another exemplary embodiment, an outer liner of a combustor of a gas turbine engine may include a plurality of liner regions arranged adjacent one another and separated by boundary lines; and a plurality of plunged air admission holes formed in the liner regions. The air admission holes within each liner region may form a V-pattern.

In accordance with yet another exemplary embodiment, a rich burn, quick quench, lean burn (RQL) combustor for a turbine engine may include an outer liner having a first group of air admission holes and defining a plurality of outer liner regions, each outer liner region being separated from an adjacent outer liner by an outer boundary line. The combustor may further include an inner liner circumscribed by the outer liner and forming a combustion chamber therebetween, the inner liner having a second group of air admission holes and defining a plurality of inner liner regions, each inner liner region being separated from an adjacent inner liner region by an inner boundary line. The combustor may further include a plurality of fuel injectors extending into the combustion chamber, each of the plurality of fuel injectors being associated with one of the outer liner regions and one of the inner liner regions. The first group of air admission holes within a respective outer liner region may include a first plunged air admission hole axially aligned with the respective fuel injector, a second plunged air admission hole approximately on the outer boundary line between the respective outer liner region and a first adjacent outer liner region, the first plunged air admission hole being downstream of the second air admission hole; a third plunged air admission hole approximately on the outer boundary line between the respective outer liner region and a second adjacent outer liner region, the third plunged air admission hole being circumferentially aligned with the second air admission hole; fourth and fifth plunged air admission holes on a line between the first and second plunged air admission holes; and sixth and seventh plunged air admission holes on a line between the second and third plunged air admission holes.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Exemplary embodiments described herein provide a rich-quench-lean gas turbine engine with a combustor that produces reduced NOx emissions. Particularly, in one exemplary embodiment, the combustor can include inner and outer liners that have a V-shaped arrangement of staggered plunged air admission holes, with quench jets arranged to produce reduced NOx emissions at a first, upstream position between injectors and at a second, downstream position aligned with the injectors.

Figure 1:
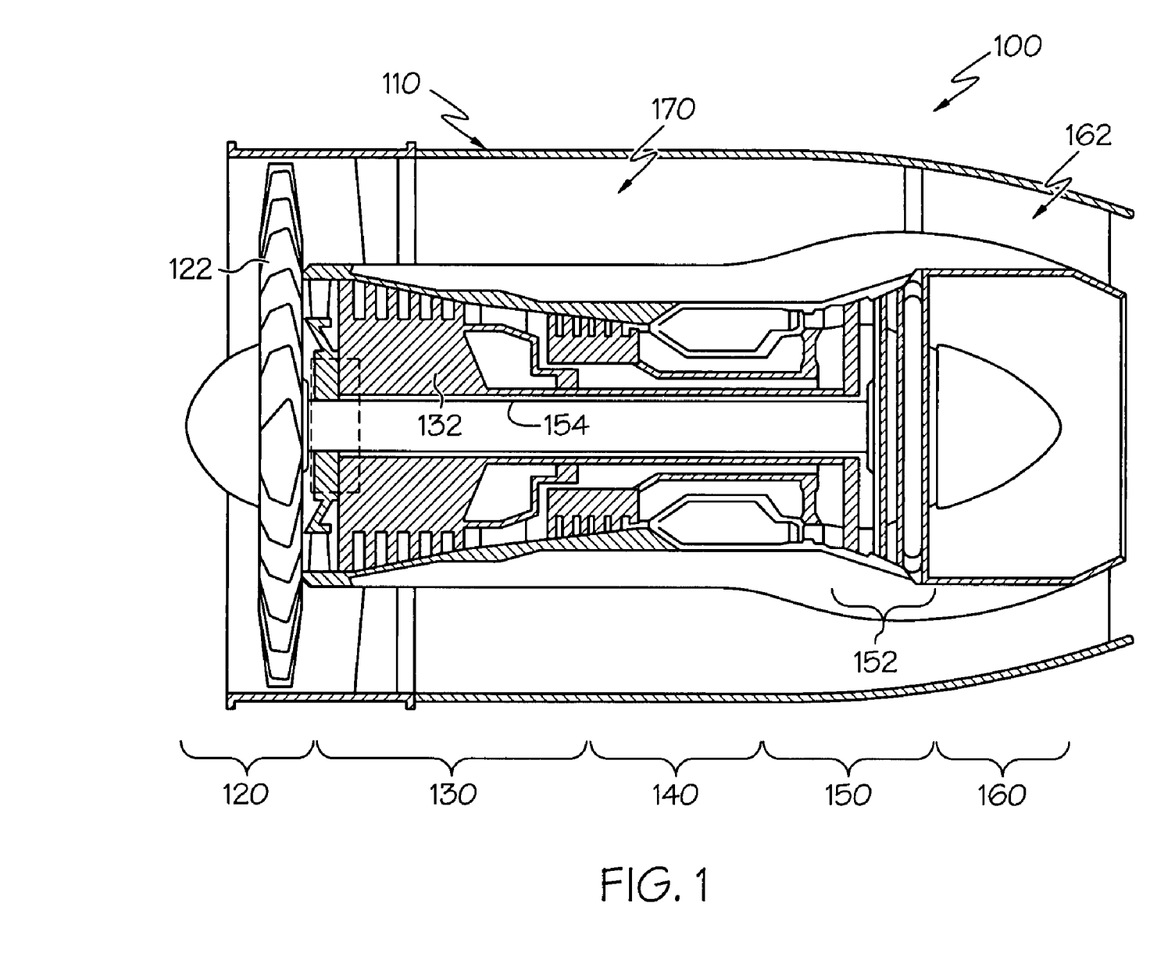
FIG. 1 is a cross-sectional view of a gas turbine engine according to an exemplary embodiment.

FIG. 1 is a simplified, cross-sectional view of a gas turbine engine 100, according to an embodiment. The engine 100 may be disposed in an engine case 110 and may include a fan section 120, a compressor section 130, a combustion section 140, a turbine section 150, and an exhaust section 160. The fan section 120 may include a fan 122, which draws in and accelerates air. A fraction of the accelerated air exhausted from the fan 122 is directed through a bypass section 170 to provide a forward thrust. The remaining fraction of air exhausted from the fan 122 is directed into the compressor section 130.

The compressor section 130 may include a series of compressors 132, which raise the pressure of the air directed into it from the fan 122. The compressors 132 may direct the compressed air into the combustion section 140. In the combustion section 140, the high pressure air is mixed with fuel and combusted. The combusted air is then directed into the turbine section 150.

The turbine section 150 may include a series of turbines 152, which may be disposed in axial flow series. The combusted air from the combustion section 140 expands through the turbines 152 and causes them to rotate. The air is then exhausted through a propulsion nozzle 162 disposed in the exhaust section 160, providing additional forward thrust. In an embodiment, the turbines 152 rotate to thereby drive equipment in the engine 100 via concentrically disposed shafts or spools. Specifically, the turbines 152 may drive the compressor 132 via one or more rotors 154.

Figure 2:
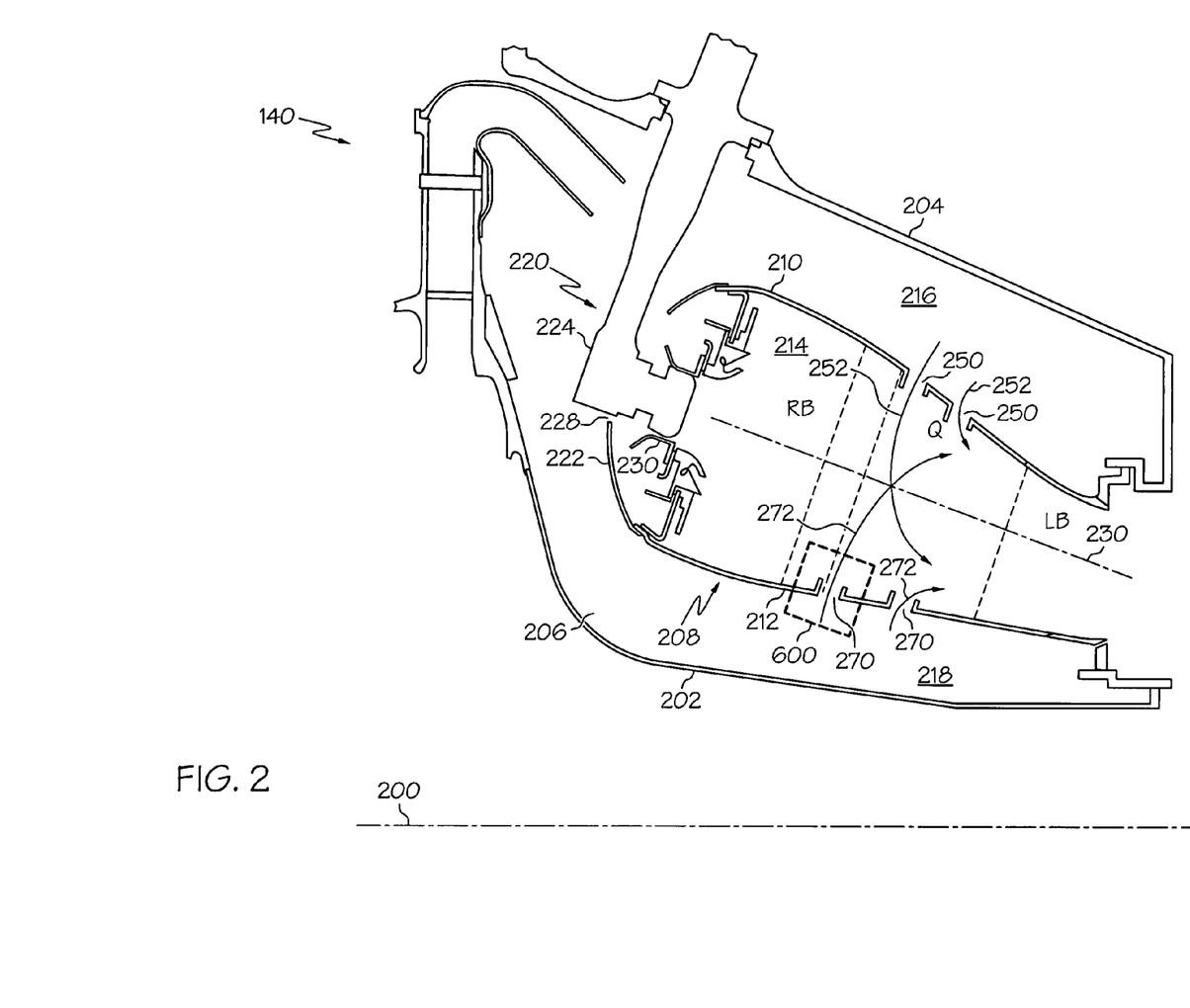
FIG. 2 is a partial, cross-sectional side elevation view of the combustor section of FIG. 1 according to an exemplary embodiment.

FIG. 2 is a more detailed cross-sectional view of the combustion section 140 of FIG. 1. In FIG. 2, only half the cross-sectional view is shown; the other half would be substantially rotationally symmetric about a centerline and axis of rotation 200.

The combustion section 140 includes a radially inner case 202 and a radially outer case 204 concentrically arranged with respect to the inner case 202. The inner and outer cases 202, 204 circumscribe the axially extending engine centerline 200 to define an annular pressure vessel 206. The combustion section 140 also includes a combustor 208 residing within the annular pressure vessel 206. The combustor 208 is defined by an outer liner 210 and an inner liner 212 that is circumscribed by the outer liner 210 to define an annular combustion chamber 214. The liners 210, 212 cooperate with cases 202, 204 to define respective outer and inner air plenums 216, 218.

The combustor 208 includes a front end assembly 220 comprising a dome assembly 222, fuel injectors 224, and fuel injector guides 230. One fuel injector 224 and one fuel injector guide 230 are shown in the partial cross-sectional view of FIG. 2. In one embodiment, the combustor 208 includes a total of sixteen circumferentially distributed fuel injectors 224, but it will be appreciated that the combustor 208 could be implemented with more or less than this number of injectors 224. Each fuel injector 224 is secured to the outer case 204 and projects through a shroud port 228. Each fuel injector 224 introduces a swirling, intimately blended fuel-air mixture that supports combustion in the combustion chamber 214.

The depicted combustor 208 is a rich burn, quick quench, lean burn (RQL) combustor. During operation, a portion of the pressurized air enters a rich burn zone RB of the combustion chamber 214 by way of passages in the front end assembly 220. This air is referred to as primary combustion air because it intermixes with a stoichiometrically excessive quantity of fuel introduced through the fuel injectors 224 to support initial combustion in the rich burn zone RB. The rich stoichiometry of the fuel-air mixture in the rich burn zone RB produces a relatively cool, oxygen-deprived flame, thus preventing excessive NOx formation and guarding against blowout of the combustion flame during any abrupt reduction in engine power.

The combustion products from the rich burn zone RB, which include unburned fuel, then enter a quench zone Q. Jets 252, 272 flow from the plenums 216, 218 and into the quench zone Q through the groups 250, 270 of air admission holes in the outer and inner liners 210, 212, respectively. The groups 250, 270 of air admission holes in the outer and inner liners 210, 212 are discussed in further detail below with reference to FIGS. 3-5.

The jets 252, 272 are referred to as quench air because they rapidly mix the combustion products from their stoichiometrically rich state at the forward edge of the quench zone Q to a stoichiometrically lean state at, or just downstream of, the aft edge of the quench zone Q. The quench air rapidly mixes with the combustion products entering the quench zone Q to support further combustion and release additional energy from the fuel. Since thermal NOx formation is a strong time-at-temperature phenomenon, it is important that the fuel-rich mixture passing through the quench zone be mixed rapidly and thoroughly to a fuel-lean state in order to avoid excessive NOx generation. Thus the design of the quench air jet arrangement in an RQL combustor is important to the successful reduction of NOx levels.

Finally, the combustion products from the quench zone Q enter a lean burn zone LB where the combustion process concludes. As the combustion products flow into the lean burn zone LB, the air jets 252, 272 are swept downstream and also continue to penetrate radially and spread out laterally and intermix thoroughly with the combustion gases.

Figure 3:
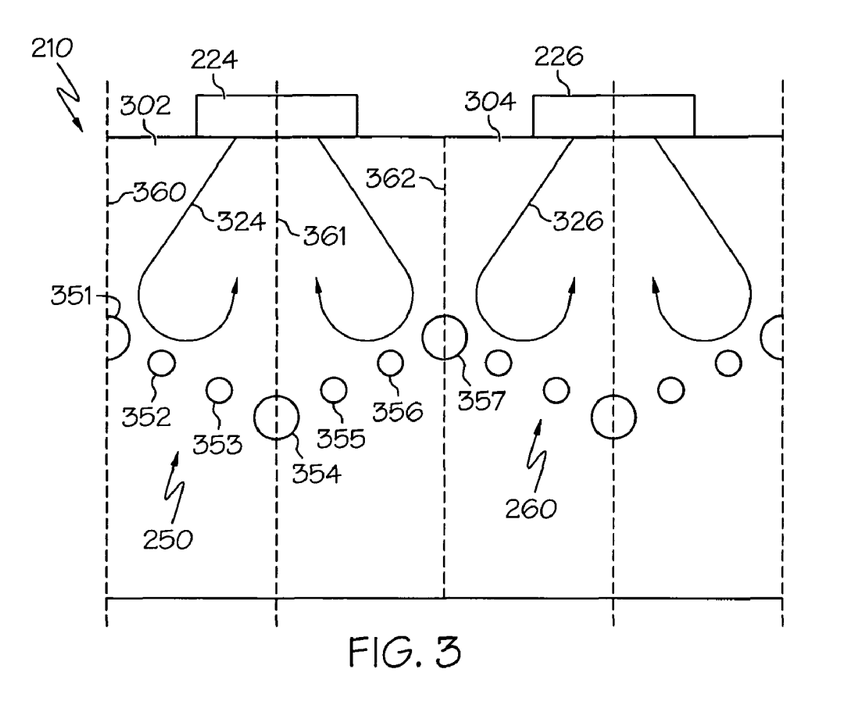
FIG. 3 is a partial, plan view of an outer liner of the combustor section of FIG. 2.

FIG. 3 is a plan view of a portion of an outer liner 210 suitable for use in a combustor such as the combustor 208 of FIG. 2. Generally, the outer liner 210 can be considered a series of regions, e.g., regions 302, 304. Each region 302, 304 is associated with an injector, e.g., injector 224, 226. Each of the regions 302, 304 is also associated with a group of air admission holes that admits jets into the quench zone Q of the combustor as discussed above. In the depicted embodiment, region 302 includes group 250 of the air admission holes and region 304 includes group 260 of the air admission holes.

As an example, group 250 includes at least portions of seven air admission holes 351-357 that form a "V" configuration to ensure that the fuel air mixture quickly becomes thoroughly blended and regularly distributed. A first air admission hole 351 is positioned on a first boundary line 360 between the region 302 and an adjacent region (not shown). Second and third air admission holes 352, 353 are adjacent to and downstream of the first air admission hole 351. The fourth air admission hole 354 is axially aligned with the injector 224, as indicated by the dashed line 361, and downstream of the third air admission hole 353. The fifth and sixth air admission holes 355, 356 are adjacent to and upstream of the fourth air admission hole 357. The seventh air admission hole 357 is positioned on a second boundary line 362 between the region 302 and the adjacent region 304 and is upstream of the sixth air admission hole 366. Generally, the first air admission hole 351 is circumferentially aligned with the seventh air admission hole 357, and the second and third air admission holes 352, 353 are respectively circumferentially aligned with the fifth and sixth air admission holes 355, 356. The first, fourth, and seventh air admission holes 351, 354, 357 are relatively larger than the second, third, fifth, and sixth air admission holes 352, 353, 355, 356. As such, the first, fourth, and seventh air admission holes 351, 354, 357 are considered "major" holes and the second, third, fifth, and sixth air admission holes 352, 353, 355, 356 are considered "minor" holes. The group 260 of air admission holes in the adjacent second region 304 are positioned in the same pattern as the group 250 of air admission holes in the first region 302 with the seventh air admission hole 357 of the first region 302 serving as the first air admission hole of the second region 304. The arrangement, position, and sizes of the air admission holes of the outer liner 210 may be adjusted as necessary or desired.

Swirler flowfield patterns 324, 326 are shown for each of the first and second regions 302, 304. Due to the tendency of the swirlers to form an "outside-in" recirculation zone, in some conventional engines, the regions in between adjacent swirlers may exhibit less effective mixing and correspondingly may result in excessive NOx formation upstream of the quench zone. The first and seventh air admission holes 351, 357 are particularly positioned between regions (e.g., regions 302, 304) to reduce residence times of the local combustion gases in the regions between adjacent swirlers and thereby reduce the formation of NOx. Similarly, the "outside-in" recirculation zone tends to draw air upstream into the core of the recirculation in line with each swirler. This results in a local reduction in the fuel-rich stoichiometry of the primary zone and produces additional NOx formation. Accordingly, the fourth air admission hole 354 is positioned further downstream from the central recirculation zone to mitigate the amount of quench air that gets recirculated, thereby further reducing NOx formation in the primary zone. The first and seventh air admission holes 351, 357 are generally upstream of similar air admission holes in some conventional combustors, and in an exemplary embodiment, the fourth air admission hole 354 is generally downstream of a similar air admission hole in some conventional combustors. The arrangement of the holes may be modified as necessary or desired.

Figure 4:
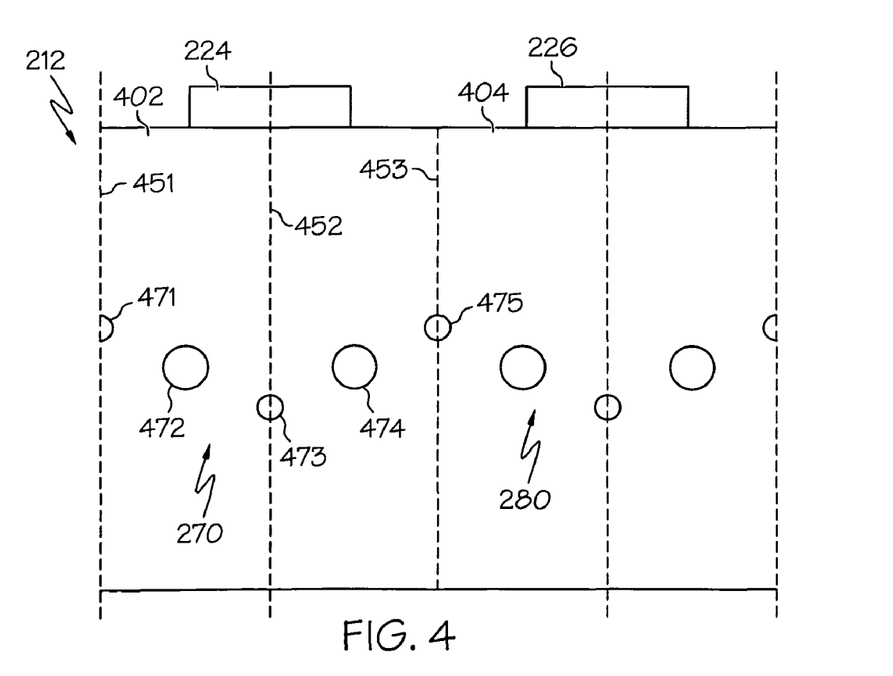
FIG. 4 is a partial, plan view of an inner liner of the combustor section of FIG. 2.

FIG. 4 is a plan view of a portion of an inner liner 212 suitable for use in a combustor such as the combustor 208 of FIG. 2 and works in conjunction with an outer liner such as outer liner 210 (FIG. 3) to sure that air is properly mixed with the fuel. Generally, the inner liner 330 can be considered a series of regions, e.g., regions 402, 404. Each region 402, 404 is associated with an injector, e.g., injector 224, 226. Each of the regions 402, 403 is also associated with a group of air admission holes that admits jets into the quench zone Q of the combustor as discussed above. In the depicted embodiment, region 402 includes group 270 of the air admission holes and region 404 includes group 280 of the air admission holes. As will be discussed in further detail below with reference to FIG. 5, the arrangement of the air admission holes 350, 360 of the inner liner 212 in FIG. 4 generally corresponds to the air admission holes 270, 280 of the outer liner 210 of FIG. 3.

As an example, region 402 includes at least portions of five air admission holes 471-475 that form a "V" configuration on the inner liner. A first air admission hole 471 is positioned on a first boundary line 451 between the region 402 and an adjacent region (not shown). A second air admission hole 472 is adjacent to and downstream of the first air admission hole 471. The third air admission hole 473 is axially aligned with the injector 224, as indicated by the dashed line 452, and downstream of the second air admission hole 472. The fourth air admission hole 474 is adjacent to and upstream of the third air admission hole 473. The fifth air admission hole 475 is positioned on a second boundary line 453 between the region 402 and the adjacent region 404 and is upstream of the fourth air admission hole 474. Generally, the first air admission hole 471 is circumferentially aligned with the fifth air admission hole 475, and the second air admission hole 472 is circumferentially aligned with the fourth air admission hole 474. The first, third, and fifth air admission holes 471, 473, 475 are relatively smaller than the second and fourth air admission holes 472, 474. As such, the first, third, and fifth air admission holes 471, 473, 475 are considered "minor" holes and the second and fourth air admission holes 472, 474 are considered "major" holes. The group 280 of air admission holes in the adjacent second region 404 are positioned in the same pattern as the group 270 of air admission holes in the first region 302 with the fifth air admission hole 475 of the first region 402 serving as the first air admission hole of the second region 404. The arrangement, position, and sizes of the air admission holes of the inner liner 212 may be adjusted as necessary or desired.

Figure 5:
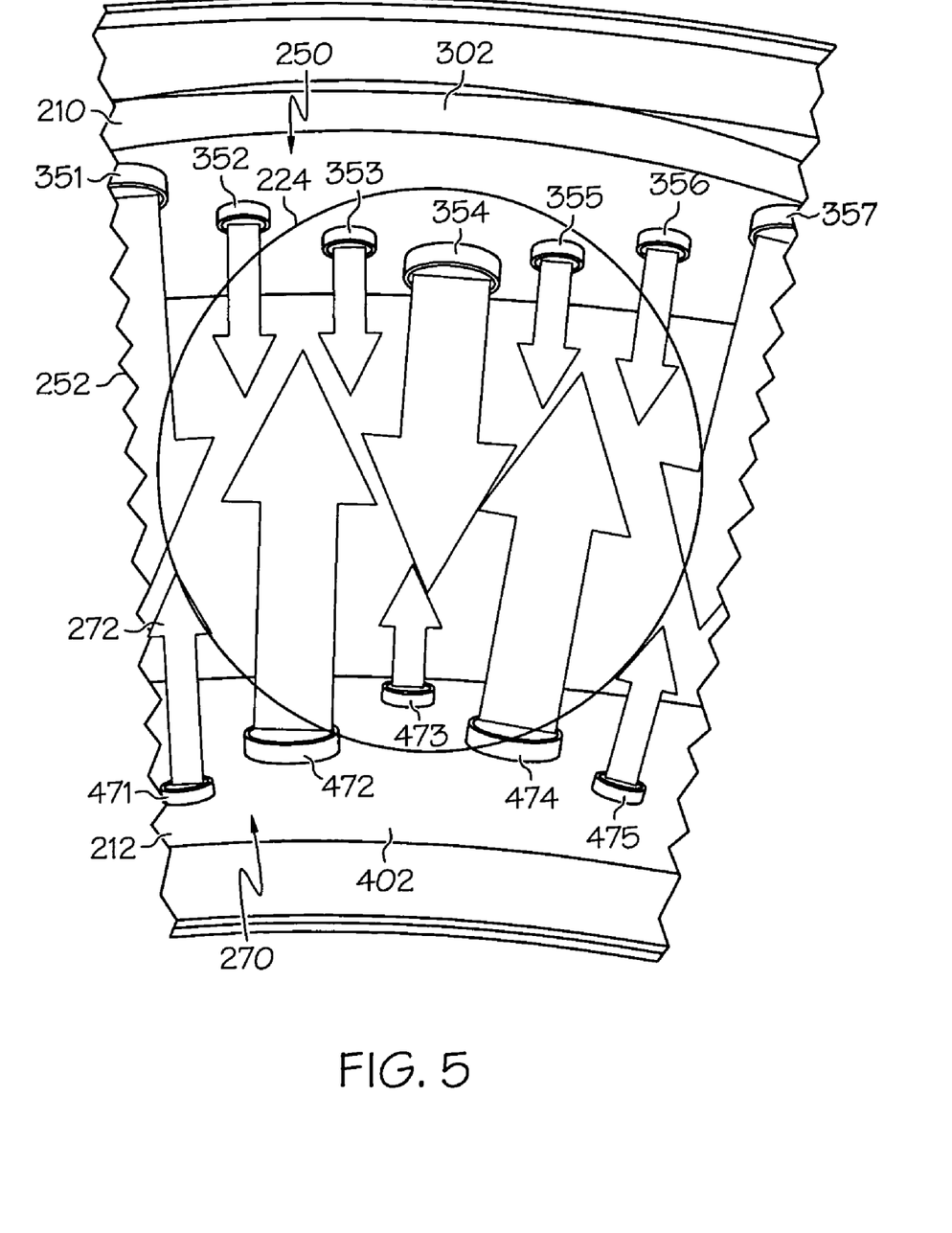
FIG. 5 is a partial, axial cross-sectional view of the combustor section of FIG. 2.

FIG. 5 illustrates a partial axial cross-sectional view of the first region 202, 302 of the outer and inner liners 210, 212. As discussed above, the air admission holes 351-357 of the outer liner 210 cooperate with air admission holes 471-475 of the inner liner 212. Generally, major jets from the major holes, such as air admission hole 351 and air admission hole 472, penetrate radially inward about 75% of the width of the combustion chamber, and minor jets from the minor holes, such as air admission hole 352 and air admission holes 471, 473, penetrate radially inward about 25% of the width of the combustion chamber. In this embodiment, the major jets from the major holes, such as air admission hole 351, are paired with minor jets from the minor holes, such as air admission hole 471. In other words, the major holes in the outer and inner liners 210, 212 can be considered staggered with respect to one another, and the minor holes in the outer and inner liners 210, 212 can similarly be considered staggered. This configuration ensures that dilution air spans radially across the entire combustion chamber annulus and that the combustion gases are properly quenched, thus preventing elevated levels of NOx.

Figure 6:
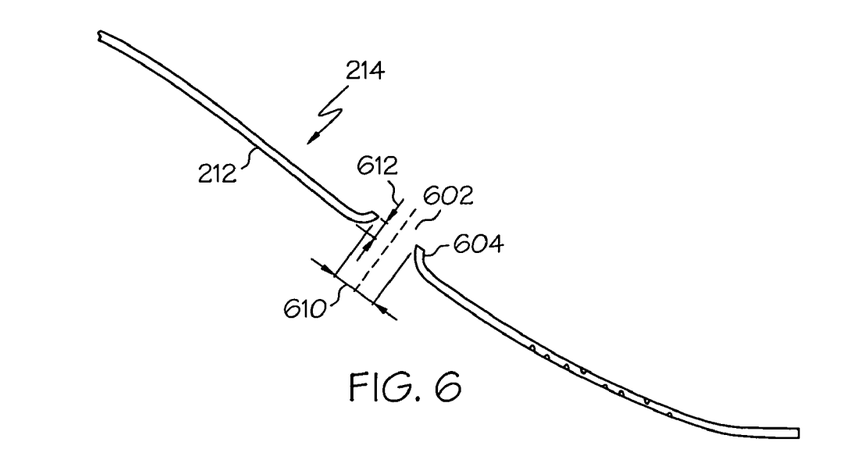
FIG. 6 is a cross-sectional view of a hole of a combustor section of FIG. 2 in accordance with an exemplary embodiment.

FIG. 6 is a cross-sectional view of an exemplary air admission hole 602 suitable use in a combustor, e.g., the combustor 208 of FIG. 2. The position of air admission hole 602 generally corresponds to portion 600 of FIG. 2, although it could also represent any of the air admission holes of the combustor 208, including air admission holes 351-357, 471-475 discussed above in reference to FIGS. 3-5. In particular, the air admission holes, such as air admission hole 602, are "plunged." In other words, a rim portion 604 of the air admission hole 602 extends into the combustion chamber 214. The plunged characteristics of the air admission holes 602 assist in the jets (e.g., jets 252, 272) in penetrating to the desired depth, as discussed above. Moreover, in one exemplary embodiment, the outer and inner liners 210, 212 have effusion holes that provide a cooling layer of air on the combustor side of the combustion chamber 214. Since this cooling layer is generally moving along the respective liner perpendicular to the major and minor jets, in conventional combustors, the cooling layer may interfere with the jets. However, in some exemplary embodiments, the plunged air admission holes 602 decrease or eliminate any interference with the effusion cooling layer.

In the embodiment shown in FIG. 6, the air admission holes 602 are formed from a single piece, either punched or molded into the liner (e.g., outer and inner liner 210, 212). In general, the air admission holes 602 may be circular or non-circular. The penetration depth of the jets (e.g., jets 252, 272) and the corresponding quantity of air admitted through the air admission holes may additionally be regulated by specifying the relative sizes (e.g., diameter 610 and length 612) of the air admission holes, i.e., a larger air admission hole 602 and/or a more plunged air admission hole 602 has a larger penetrative depth. As a result of this configuration, the temperature profile of the combustion gases can be adjusted, for example, by adjusting the size of the air admission holes 602, without compromising fuel-air mixing, which could lead to elevated levels of NOx.

An exemplary diameter of the air admission holes 602 associated with major holes (e.g., hole 351 in FIG. 5) is about 0.4 inches, and exemplary diameter of air admission holes 602 associated with minor holes (e.g., hole 471 in FIG. 5) is about 0.25 inches, although the diameters can vary and can be scaled for larger or smaller engines.

In one embodiment, the plunge radius of curvature and depth of the air admission hole may depend on material thickness and hole diameter. For example, with a 0.02 inch diameter hole, the plunge radius of curvature may be 0.080 to 0.100 inches to create a desirable flow inlet. The plunge radius of curvature in thicker material it may be larger, such as about 0.150 inches. In one embodiment, the depth of the air admission hole may be between 0.075 to 0.150 inches. In general, the depth may be sufficient to extend through the cooling film and provide some reduction of the discharge coefficient.

Figures 7, 8:
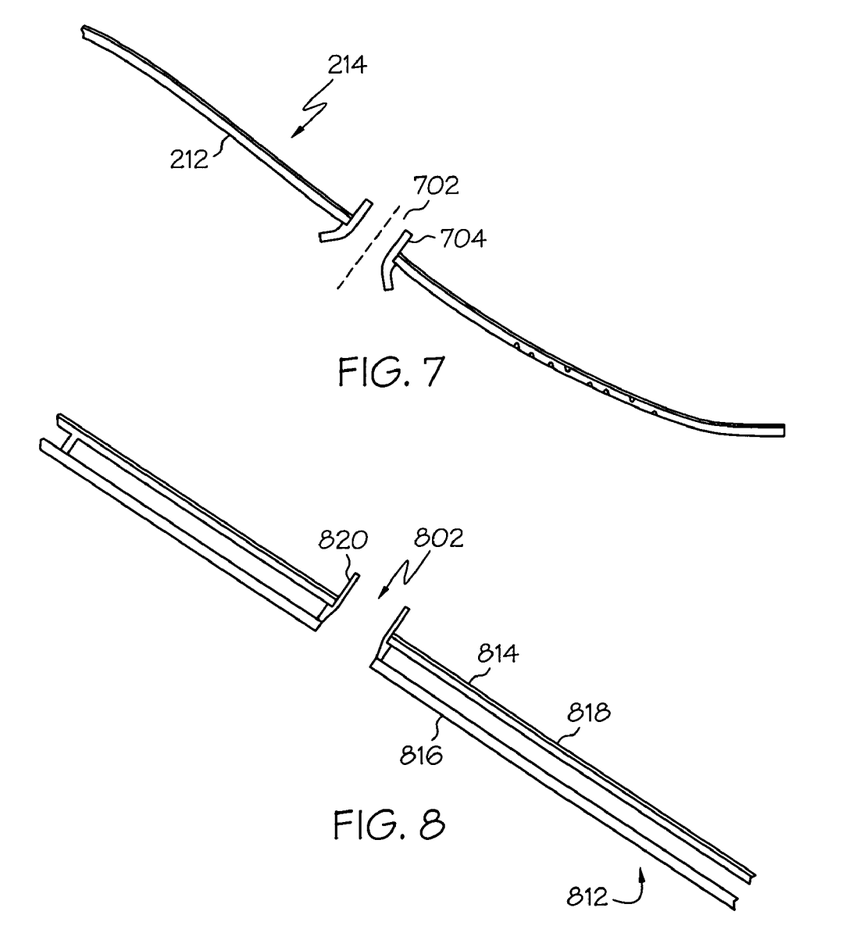
FIG. 7 is a cross-sectional view of a hole of the combustor section of FIG. 2 in accordance with an alternate exemplary embodiment.
FIG. 8 is a cross-sectional view of a hole of a combustor section in accordance with another alternate exemplary embodiment.

FIG. 7 is a cross-sectional view of an air admission hole 702 in accordance with an alternate exemplary embodiment that generally corresponds to the air admission holes discussed above. In this embodiment, the air admission hole 702 is plunged with an insert 704, which can be manufactured separately and installed in the outer or inner liner 210, 212.

FIG. 8 is a cross-sectional view of a portion of a combustor liner 812 in accordance with an additional exemplary embodiment. In this embodiment, the combustor liner 812 can be the inner or outer liner in a combustor similar to those described above. Moreover, the combustor liner 812 is a dual wall liner with a first, inner wall 814 and a second, outer wall 816 that may increase the cooling effects of the combustor walls. Typically, in a dual wall configuration, the inner wall 814 includes a plurality of cooling tiles or heat shields 818. This improved cooling may lead to additional air available for the combustion process and a corresponding decrease in unwanted emissions.

The combustor liner 812 further includes an air admission hole 802 in accordance with an alternate exemplary embodiment that generally corresponds to the air admission holes discussed above. In this embodiment, the air admission hole 802 is plunged with an insert 820, which can be manufactured separately and installed in the combustor liner 812. In any of the embodiments discussed above, particularly the embodiments in FIGS. 6-8, the inlets and/or outlets of the air admission holes 602, 702, 802 may be modified as necessary or desired. For example, the inlets of the air admission holes 602, 702, 802 may be a non-circular shape, including rectangular, racetrack, oval, and square. Additionally, the air admission holes 602, 702, 802 may be clocked if additional alignment or interleaving of the jets is desire in dependence, for example, on upstream swirl and effusion film.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A combustor for a turbine engine, comprising:
   an outer liner having a first group of air admission holes and defining a plurality of outer liner regions, each outer liner region being separated from an adjacent outer liner region by an outer boundary line;
   an inner liner circumscribed by the outer liner and forming a combustion chamber therebetween, the inner liner having a second group of air admission holes and defining a plurality of inner liner regions, each inner liner region being separated from an adjacent inner liner region by an inner boundary line; and
   a plurality of fuel injectors extending into the combustion chamber, each of the plurality of fuel injectors being associated with one of the outer liner regions and one of the inner liner regions, wherein the first group of air admission holes within a respective outer liner region includes
      a first plunged air admission hole approximately axially aligned with the respective fuel injector,
      a second plunged air admission hole approximately on the outer boundary line between the respective outer liner region and a first adjacent outer liner region, the first air admission hole being downstream of the second air admission hole,
      a third plunged air admission hole approximately on the outer boundary line between the respective outer liner region and a second adjacent outer liner region, fourth and fifth plunged air admission holes arranged on a line between the first and second plunged air admission holes, and sixth and seventh plunged air admission holes arranged on a line between the second and third plunged air admission holes.

2. The combustor of claim 1, wherein the first, second and third plunged air admission holes are larger than the fourth, fifth, sixth and seventh plunged air admission holes.

3. The combustor of claim 1, wherein the first and second plunged air admission holes are arranged to respectively reduce NOx in the combustion chamber at the first outer boundary line and downstream of the respective fuel injector.

4. The combustor of claim 1, wherein the first group of air admission holes has a pattern that is repeated in additional groups of air admission holes in the adjacent outer regions.

5. The combustor of claim 1, wherein the combustion chamber defines a rich burn zone, a quench zone, and a lean burn zone, the first group of air admission holes introducing air jets into quench zone.

6. The combustor of claim 1, wherein the first plunged air admission hole is integral with the outer liner.

7. The combustor of claim 1, wherein the first plunged air admission hole includes an insert that extends into the combustion chamber.

8. The combustor of claim 1, wherein the outer liner is a dual walled liner with a first wall and a second wall.

9. The combustor of claim 8, wherein the first plunged air admission hole includes an insert that directs air through the first wall, through the second wall, and into the combustion chamber.

10. A combustor for a turbine engine, comprising:
an outer liner having a first group of air admission holes and defining a plurality of outer liner regions, each outer liner region being separated from an adjacent outer liner region by an outer boundary line;
an inner liner circumscribed by the outer liner and forming a combustion chamber therebetween, the inner liner having a second group of air admission holes and defining a plurality of inner liner regions, each inner liner region being separated from an adjacent inner liner region by an inner boundary line; and
a plurality of fuel injectors extending into the combustion chamber, each of the plurality of fuel injectors being associated with one of the outer liner regions and one of the inner liner regions, wherein the first group of air admission holes within a respective outer liner region includes
a first plunged air admission hole approximately axially aligned with the respective fuel injector,
a second plunged air admission hole approximately on the outer boundary line between the respective outer liner region and a first adjacent outer liner region, the first air admission hole being downstream of the second air admission hole, and
a third plunged air admission hole approximately on the outer boundary line between the respective outer liner region and a second adjacent outer liner region,
wherein the second group of air admission holes within a respective inner liner region includes
a plunged first plunged air admission hole axially aligned with the respective fuel injector,
a second plunged air admission hole approximately on the inner boundary line between the respective inner liner region and a first adjacent inner liner region, the first plunged air admission hole being downstream of the second plunged air admission hole,
a third plunged air admission hole approximately on the inner boundary line between the respective inner liner region and a second adjacent inner liner region,
a fourth plunged air admission hole of the second group that is on a line between the first and second plunged air admission holes, and
a fifth plunged air admission hole of the second group that is on a line between the second and third plunged air admission holes.

11. The combustor of claim 10, wherein the first group of air admission holes is generally aligned with the second group of air admission holes.

12. The combustor of claim 10, wherein the second group of air admission holes has a pattern that is repeated in additional groups of air admission holes in the adjacent outer regions.

13. The combustor of claim 10, wherein first and second groups each include a plurality of large air admission holes, the large air admission holes of the first and second groups being circumferentially staggered with respect to each other.

14. The combustor of claim 10, wherein the combustor chamber defines a width and wherein the first plunged air admission hole of the first group admits a first air jet that penetrates about 75% of the width of the combustor chamber and the first plunged air admission hole of the second group admits a second air jet that penetrates about 25% of the width of the combustion chamber.

15. A rich burn, quick quench, lean burn (RQL) combustor for a turbine engine, comprising:
an outer liner having a first group of air admission holes and defining a plurality of outer liner regions, each outer liner region being separated from an adjacent outer liner by an outer boundary line;
an inner liner circumscribed by the outer liner and forming a combustion chamber therebetween, the inner liner having a second group of air admission holes and defining a plurality of inner liner regions, each inner liner region being separated from an adjacent inner liner region by an inner boundary line; and
a plurality of fuel injectors extending into the combustion chamber, each of the plurality of fuel injectors being associated with one of the outer liner regions and one of the inner liner regions,
wherein the first group of air admission holes within a respective outer liner region includes
a first plunged air admission hole axially aligned with the respective fuel injector,
a second plunged air admission hole approximately on the outer boundary line between the respective outer liner region and a first adjacent outer liner region, the first plunged air admission hole being downstream of the second air admission hole;
a third plunged air admission hole approximately on the outer boundary line between the respective outer liner region and a second adjacent outer liner region, the third plunged air admission hole being circumferentially aligned with the second air admission hole;
fourth and fifth plunged air admission holes on a line between the first and second plunged air admission holes; and
sixth and seventh plunged air admission holes on a line between the second and third plunged air admission holes.

16. The combustor of claim 15, wherein the second group of air admission holes within a respective inner liner region includes a first plunged air admission hole of the inner liner axially aligned with the respective fuel injector, a second plunged air admission hole of the inner liner approximately on the inner boundary line between the respective inner liner region and a first adjacent inner liner region, the first plunged air admission hole of the inner liner being downstream of the second plunged air admission hole of the inner liner, a third plunged air admission hole of the inner liner approximately on the inner boundary between the respective inner liner region and a second adjacent inner liner region, a fourth plunged air admission hole of the inner liner that is downstream of the second plunged air admission hole of the inner liner, upstream of the first plunged air admission hole of the inner liner, and circumferentially between the first and second plunged air admission holes of the inner liner; and a fifth plunged air admission hole of the inner liner that is downstream of the third plunged air admission hole of the inner liner, upstream of the first plunged air admission hole of the inner liner, and circumferentially between the first and third plunged air admission holes of the inner liner.

* * * * *